United States Patent
Yu et al.

(10) Patent No.: US 10,486,244 B2
(45) Date of Patent: Nov. 26, 2019

(54) METHOD FOR MACHINING FLANGE FACE OF ALUMINUM ALLOY HUB

(71) Applicant: CITIC Dicastal CO., LTD, Qinhuangdao (CN)

(72) Inventors: Zhiyuan Yu, Qinhuangdao (CN); Minghua Liu, Qinhuangdao (CN); Yao Zheng, Qinhuangdao (CN); Weimin Cai, Qinhuangdao (CN); Ruixiao Zhou, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 0 days.

(21) Appl. No.: 16/172,113

(22) Filed: Oct. 26, 2018

(65) Prior Publication Data

US 2019/0126362 A1    May 2, 2019

(30) Foreign Application Priority Data

Oct. 31, 2017   (CN) ........................ 2017 1 1054262

(51) Int. Cl.
*B23B 1/00*    (2006.01)
*B23C 3/12*    (2006.01)
(Continued)

(52) U.S. Cl.
CPC .................. *B23C 3/02* (2013.01); *B23C 3/12* (2013.01); *B23B 1/00* (2013.01); *B23B 39/22* (2013.01);
(Continued)

(58) Field of Classification Search
CPC ..... B23B 39/22; B23B 35/00; B23B 2215/08; B23B 2228/21; B23B 2220/32;
(Continued)

(56) References Cited

U.S. PATENT DOCUMENTS 2,657,063 A * 10/1953 Trosch ...................... B23B 5/28
 279/71
4,866,834 A * 9/1989 Winkler .................. B23B 41/00
 483/1

(Continued)

FOREIGN PATENT DOCUMENTS

CN         105728747 A       7/2016
CN         105855577 B       4/2017
WO   WO-2005099942 A1 *   10/2005   ............... B23B 5/00

OTHER PUBLICATIONS

Tuo Wu , "机械制造工艺与机床夹具 第2版", p. 158, Oct. 31, 2011, China Mechine Press.

(Continued)

*Primary Examiner* — Nicole N Ramos
(74) *Attorney, Agent, or Firm* — Calfee, Halter & Griswold LLP

(57) ABSTRACT

The present application provides a method for machining a flange face of an aluminum alloy hub, comprising the steps of: (I) pre-machining a hub flange; (II) machining two times with a 120° R3 boring tool with a total machining amount of 2 mm, and then reserving a machining allowance of 2.4 mm on the flange face blank after processing; (III) machining two times with the 120° R3 boring tool with a total machining amount of 2 mm, and then reserving a machining allowance of 0.4 mm on the flange face blank after processing; (IV) machining with a 95° R0.8 hook tool, and then reserving a machining allowance of 0.05 mm on the flange face after processing; and (V) machining with the 95° R0.8 hook tool, then machining the remaining flange allowance, thus completing the machining.

4 Claims, 2 Drawing Sheets

US 10,486,244 B2
Page 2

(51) Int. Cl.
*B23C 3/02* (2006.01)
*B23B 39/22* (2006.01)

(52) U.S. Cl.
CPC ..... *B23B 2215/08* (2013.01); *B23C 2215/085* (2013.01)

(58) Field of Classification Search
CPC .......... B23B 2247/08; B23Q 2039/002; B23Q 2039/006; Y10T 408/378; Y10T 408/3788; Y10T 408/3792; Y10T 408/375
See application file for complete search history.

(56) References Cited

U.S. PATENT DOCUMENTS

| | | | |
|---|---|---|---|
| 8,172,489 B2* | 5/2012 | Prust | B23B 31/16275 269/134 |
| 2001/0039732 A1* | 11/2001 | Smyth | B23P 15/00 29/894.35 |
| 2002/0101112 A1 | 8/2002 | Gatton | |
| 2004/0170769 A1* | 9/2004 | Gatton | B23B 5/02 427/402 |
| 2005/0120557 A1* | 6/2005 | Gatton | B23B 5/02 29/894.32 |
| 2006/0042091 A1* | 3/2006 | Luschei | B23B 1/00 29/894.35 |
| 2008/0011130 A1 | 1/2008 | Smyth | |
| 2011/0068544 A1* | 3/2011 | Prust | B23B 31/16275 279/4.02 |
| 2012/0073413 A1* | 3/2012 | Len | B23B 5/00 82/104 |
| 2014/0271016 A1* | 9/2014 | Chou | B23B 31/185 409/224 |
| 2016/0052067 A1* | 2/2016 | Stricklen | B23B 39/161 408/1 BD |
| 2017/0157677 A1 | 6/2017 | Liu et al. | |
| 2018/0071828 A1* | 3/2018 | Sun | B23B 5/28 |

OTHER PUBLICATIONS

Qingling Kong, "金工实训", p. 215, Mar. 31, 2012, Tsinghua University Press.

* cited by examiner

METHOD FOR MACHINING FLANGE FACE OF ALUMINUM ALLOY HUB

CROSS-REFERENCE TO RELATED APPLICATIONS

This application claims priority to Chinese Patent Application No. 201711054262.6 filed on Oct. 31, 2017, which is hereby incorporated by reference in its entirety.

TECHNICAL FIELD

The present application relates to the technical field of motor vehicle hubs, specifically to a method for machining a flange face of an aluminum alloy hub.

BACKGROUND ART

Aluminum alloy hubs have won the favor of more and more private car owners by its attractive appearance, safety, comfort and other characteristics. Since the aluminum alloy hubs are light in weight and high in manufacturing precision, the aluminum alloy hubs have small deformation and low inertial resistance during high-speed rotation. The aluminum alloy hubs have the metal characteristics of absorbing vibration and rebounding force, and have the advantages of high dimensional accuracy, high roundness, small yaw and good balance after being machined by a numerical control machine, so that cars are driven smoothly and comfortably.

In the machining process of an aluminum alloy hub, since the planeness of flange is ≤0.02 mm, the machining is difficult, resulting in low yield of machined products. If the flange of the half axle is not tightly fitted to the wheel flange, the brake will produce abnormal sound in the driving process of the car to affect personal safety.

At present, the conventional machining method (as Comparative Example 1) is to turn the flange face four times, including two times of rough turning with a turning amount of 2 mm every time and two times of finish turning with a turning amount of 0.2 mm every time, in the A-B direction. The method has the disadvantages: (1) the turning amount of the last finish turning is too large and the yield is low; and (2) the blade as a main force bearing point in the turning direction A-B has a large turning amount, and the machining route is easily deformed during the turning process.

SUMMARY OF THE INVENTION

Accordingly, the object of the present application is to provide a machining method with higher flange plane machining accuracy.

In one aspect of the present application, provided is a method for machining a flange face of an aluminum alloy hub, the method including the steps of: (I) pre-machining a hub flange; (II) machining two times with a 120° R3 boring tool, at a forward speed of 1200-1500 r/min of the hub and a rough turning feed rate of 0.40-0.50 mm/r and with a total machining amount of 2 mm, and then reserving a machining allowance of 2.4 mm on the flange face blank; (III) machining two times with the 120° R3 boring tool, at the forward speed of 1200-1500 r/min of the hub and the rough turning feed rate of 0.40-0.50 mm/r and with a total machining amount of 2 mm, and then reserving a machining allowance of 0.4 mm on the flange face blank; (IV) machining with a 95° R0.8 hook tool, at the forward speed of 1200-1500 r/min of the hub and a finish turning feed rate of 0.15-0.2 mm/r and with a turning amount of 0.35 mm, and then reserving a machining allowance of 0.05 mm on the flange face; and (V) machining with the 95° R0.8 hook tool, at the forward speed of 1200-1500 r/min of the hub and a finish turning feed rate of 0.1-0.12 mm/r and with a turning amount of 0.05 mm, and then machining the remaining flange allowance, thus completing the machining.

In a preferred aspect of the present application, in steps II and III, the forward speed of the hub is set to 1200 r/min, the rough turning feed rate is 0.40 mm/r, and the turning amount is 1 mm every time; in step IV, the forward speed of the hub is set to 1200 r/min, the first finish turning feed rate is 0.15 mm/r, and the turning amount is 0.35 mm; and in step V, the forward speed of the hub is set to 1200 r/min, the second finish turning feed rate is 0.1 mm/r, and the turning amount is 0.05 mm.

In a preferred aspect of the present application, in steps II and III, the forward speed of the hub is set to 1400 r/min, the rough turning feed rate is 0.45 mm/r, and the turning amount is 1 mm every time; in step IV, the forward speed of the hub is set to 1300 r/min, the first finish turning feed rate is 0.18 mm/r, and the turning amount is 0.35 mm; and in step V, the forward speed of the hub is set to 1300 r/min, the second finish turning feed rate is 0.11 mm/r, and the turning amount is 0.05 mm.

In a preferred aspect of the present application, in steps II and III, the forward speed of the hub is set to 1500 r/min, the rough turning feed rate is 0.5 mm/r, and the turning amount is 1 mm each time; in step IV, the forward speed of the hub is set to 1500 r/min, the first finish turning feed rate is 0.2 mm/r, and the turning amount is 0.35 mm; and in step V, the forward speed of the hub is set to 1500 r/min, the second finish turning feed rate is 0.12 mm/r, and the turning amount is 0.05 mm.

The advantages of the present application are that: (1) the feed rate and turning amount of last finish turning of the flange face are reduced, and the planeness acceptability of the flange is ensured. (2) The machining direction is from the inner side of the flange to the outer side, and the tool bar is stressed during turning, so that the machining route is not easy to be deformed, and the guarantee ability is strong.

BRIEF DESCRIPTION OF DRAWINGS

The embodiments of the present application will be described in detail below in combination with the accompanying drawings, in which.

Figure 1:
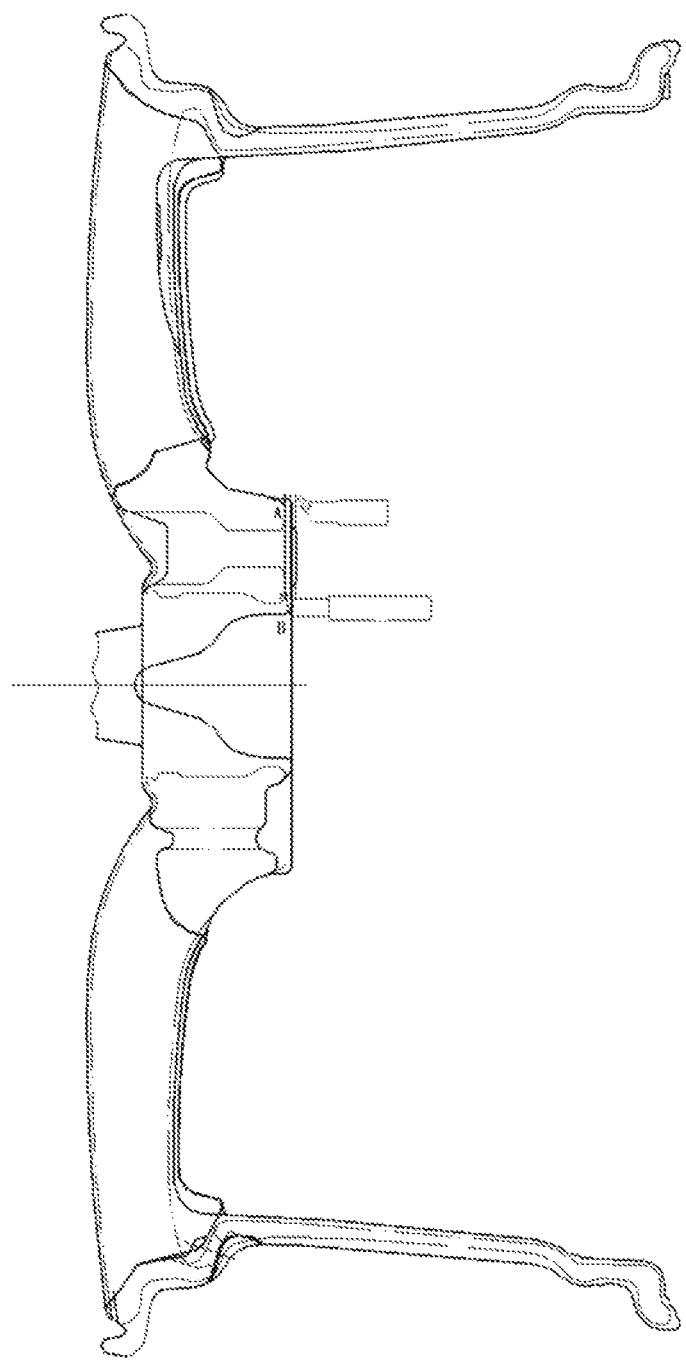
FIG. 1 is a schematic diagram of machining of a flange face in Embodiment 1.
Figure 2:
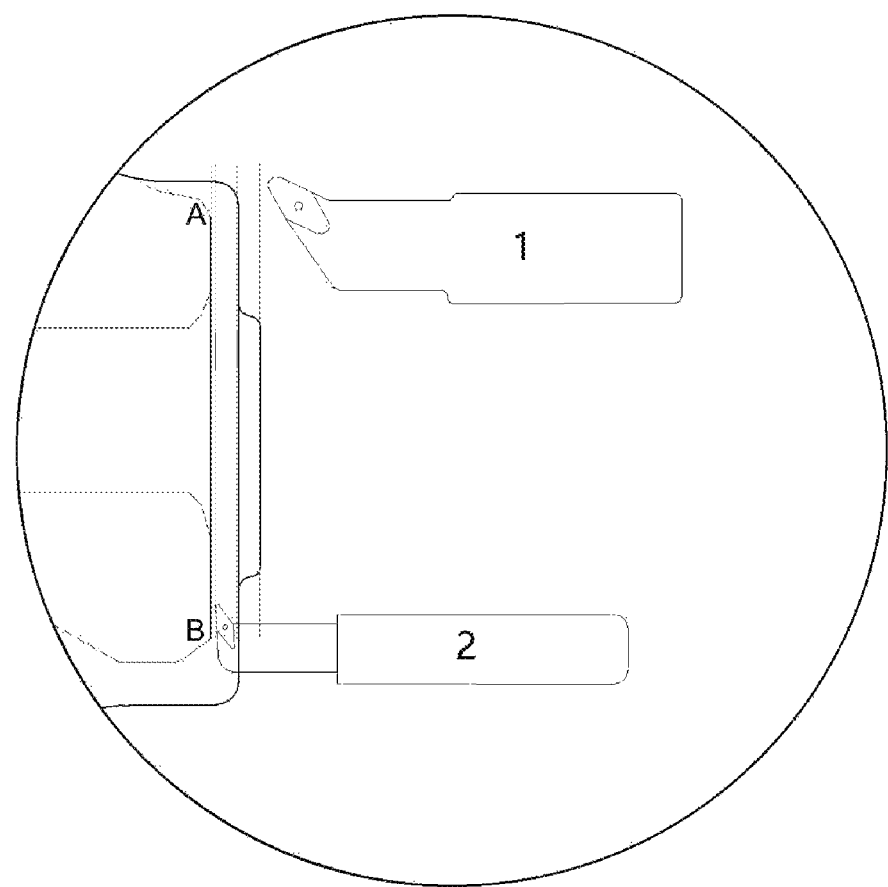
FIG. 2 is a partial enlarged view of machining of the flange face in Embodiment 1.

In which: A—inner side of the flange; B—outer side of the flange; 1-120° R3 boring tool; 2-95° R0.8 hook tool.

DETAILED DESCRIPTION OF THE INVENTION

The details and working conditions of the specific device proposed by the present application will be described below in combination with the accompanying drawings.

In the operation process, a wheel is clamped on a numerical control machine tool by a fixture. A motor drives a spindle of the machine tool to rotate, so that the wheel rotates counterclockwise at a certain speed. The blade is clamped horizontally on a turret together with a standard tool bar to machine a flange face at a certain feed rate in accordance with a pre-programmed machining program. According to the present application, the blank is maximally turned first using a 120° R3 boring tool at a certain feed rate, a machining allowance of 0.4 mm is reserved, and then the remaining machining allowance is turned from B to A using a 95° R0.8 hook tool at a certain feed rate.

Embodiment 1

A flange is turned four times, when a 120° R3 boring tool is used for rough turning, the forward speed of the hub is set to 1200 r/min, the rough turning feed rate is 0.40 mm/r, and the turning amount is 1 mm each time; and when a 95° hook tool is used for finish turning, the forward speed of the hub is set to 1200 r/min, the first finish turning feed rate is 0.15 mm/r and the turning amount is 0.35 mm, the second finish turning feed rate is 0.1 mm/r and the turning amount is 0.05 mm.

Embodiment 2

A flange is turned four times, when a 120° R3 boring tool is used for rough turning, the forward speed of the hub is set to 1400 r/min, the rough turning feed rate is 0.45 mm/r, and the turning amount is 1 mm each time; and when a 95° hook tool is used for finish turning, the forward speed of the hub is set to 1300 r/min, the first finish turning feed rate is 0.18 mm/r and the turning amount is 0.35 mm, the second finish turning feed rate is 0.11 mm/r and the turning amount is 0.05 mm.

Embodiment 3

A flange is turned four times, when a 120° R3 boring tool is used for rough turning, the forward speed of the hub is set to 1500 r/min, the rough turning feed rate is 0.5 mm/r, and the turning amount is 1 mm each time; and when a 95° hook tool is used for finish turning, the forward speed of the hub is set to 1500 r/min, the first finish turning feed rate is 0.2 mm/r and the turning amount is 0.35 mm, the second finish turning feed rate is 0.12 mm/r and the turning amount is 0.05 mm.

Embodiment 4

The planeness of the machined flanges of Embodiments 1-3 above and Comparative Example 1 is evaluated by using a three-coordinate instrument. 36 points are respectively selected from four groups of flange planes to measure their three-dimensional coordinates. Through the least squares plane fitting, the degree of regularity of each group of planes is investigated. The test shows that the planeness of Embodiments 1-3 is much higher than that of Comparative Example 1. It is believed that the progressive machining ensures a high standard of final machining accuracy.

In addition, it is also found that in the case of using different tools in steps II-V, after 150,000 hubs are machined, the replacement frequency of the hard alloy hook tool in step V is extremely low and reaches 7000 rounds once. The replacement frequency of the hard alloy hook tool in steps IV-V reaches 3,500 rounds once. Adding the both, the effective machining number of hubs is improved by more than 20% over the comparative example.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for machining a flange face of an aluminum alloy hub, comprising the steps of: (I) pre-machining a hub flange; (II) machining two times with a 120° R3 boring tool, at a forward speed of 1200-1500 r/min of the hub and a rough turning feed rate of 0.40-0.50 mm/r and with a total machining amount of 2 mm, and then reserving a machining allowance of 2.4 mm on the flange face blank; (III) machining two times with the 120° R3 boring tool, at the forward speed of 1200-1500 r/min of the hub and the rough turning feed rate of 0.40-0.50 mm/r and with a total machining amount of 2 mm, and then reserving a machining allowance of 0.4 mm on the flange face blank; (IV) machining with a 95° R0.8 hook tool, at the forward speed of 1200-1500 r/min of the hub and a finish turning feed rate of 0.15-0.2 mm/r and with a turning amount of 0.35 mm, and then reserving a machining allowance of 0.05 mm on the flange face; and (V) machining with the 95° R0.8 hook tool, at the forward speed of 1200-1500 r/min of the hub and a finish turning feed rate of 0.1-0.12 mm/r and with a turning amount of 0.05 mm, and then machining the remaining flange allowance, thus completing the machining.

2. The method for machining a flange face of an aluminum alloy hub according to claim 1, wherein in steps II and III, the forward speed of the hub is set to 1200 r/min, the rough turning feed rate is 0.40 mm/r, and the turning amount is 1 mm each time; in step IV, the forward speed of the hub is set to 1200 r/min, the first finish turning feed rate is 0.15 mm/r, and the turning amount is 0.35 mm; and in step V, the forward speed of the hub is set to 1200 r/min, the second finish turning feed rate is 0.1 mm/r, and the turning amount is 0.05 mm.

3. The method for machining a flange face of an aluminum alloy hub according to claim 1, wherein in steps II and III, the forward speed of the hub is set to 1400 r/min, the rough turning feed rate is 0.45 mm/r, and the turning amount is 1 mm each time; in step IV, the forward speed of the hub is set to 1300 r/min, the first finish turning feed rate is 0.18 mm/r, and the turning amount is 0.35 mm; and in step V, the forward speed of the hub is set to 1300 r/min, the second finish turning feed rate is 0.11 mm/r, and the turning amount is 0.05 mm.

4. The method for machining a flange face of an aluminum alloy hub according to claim 1, wherein in steps II and III, the forward speed of the hub is set to 1500 r/min, the rough turning feed rate is 0.5 mm/r, and the turning amount is 1 mm each time; in step IV, the forward speed of the hub is set to 1500 r/min, the first finish turning feed rate is 0.2 mm/r, and the turning amount is 0.35 mm; and in step V, the forward speed of the hub is set to 1500 r/min, the second finish turning feed rate is 0.12 mm/r, and the turning amount is 0.05 mm.

\* \* \* \* \*